(12) United States Patent
Nakaizawa

(10) Patent No.: US 9,275,244 B2
(45) Date of Patent: Mar. 1, 2016

(54) AUTHENTICATION APPARATUS SHOWING INPUTTED PASSWORD UNRECOGNIZABLE

(71) Applicant: KYOCERA Document Solutions Inc., Osaka (JP)

(72) Inventor: Tomoaki Nakaizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/556,131

(22) Filed: Nov. 29, 2014

(65) Prior Publication Data

US 2015/0154412 A1 Jun. 4, 2015

(30) Foreign Application Priority Data

Nov. 29, 2013 (JP) ................................ 2013-247050

(51) Int. Cl.

| G06F 3/12 | (2006.01) |
|---|---|
| G06F 21/60 | (2013.01) |
| G06F 3/0488 | (2013.01) |
| G06F 21/31 | (2013.01) |
| G06F 21/84 | (2013.01) |

(52) U.S. Cl.
CPC ............ *G06F 21/608* (2013.01); *G06F 3/0488* (2013.01); *G06F 3/1222* (2013.01); *G06F 3/1238* (2013.01); *G06F 21/31* (2013.01); *G06F 21/84* (2013.01); *G06F 2221/031* (2013.01); *G06F 2221/032* (2013.01)

(58) Field of Classification Search
None
See application file for complete search history.

(56) References Cited

U.S. PATENT DOCUMENTS

| 6,560,711 B1 | 5/2003 | Given |
| 2011/0074703 A1 | 3/2011 | Black |
| 2012/0108336 A1* | 5/2012 | Homer ............................ 463/37 |
| 2012/0113061 A1* | 5/2012 | Ikeda ..................... G06F 3/041 345/175 |
| 2013/0067385 A1* | 3/2013 | Demopoulos et al. ........ 715/780 |

FOREIGN PATENT DOCUMENTS

| JP | 2009-044349 A | 2/2009 |
| JP | 2009-205471 A | 9/2009 |

* cited by examiner

*Primary Examiner* — Ming Hon
(74) *Attorney, Agent, or Firm* — Hawaii Patent Services; Nathaniel K. Fedde; Kenton N. Fedde

(57) ABSTRACT

Provided is an authentication apparatus that, in case of showing an inputted password as an unrecognizable state, shows it a recognizable state with maintaining confidentiality according to operation by a user. The password inputted by the user is shown on a password input area as the unrecognizable state, such as "*." While a password peripheral region is pushed by the user along with a password input area, a control part changes the password from the unrecognizable state, where a displaying condition of the password shown on password viewing area being hidden by "*," into the recognizable state, and the inputted password itself are shown.

7 Claims, 9 Drawing Sheets

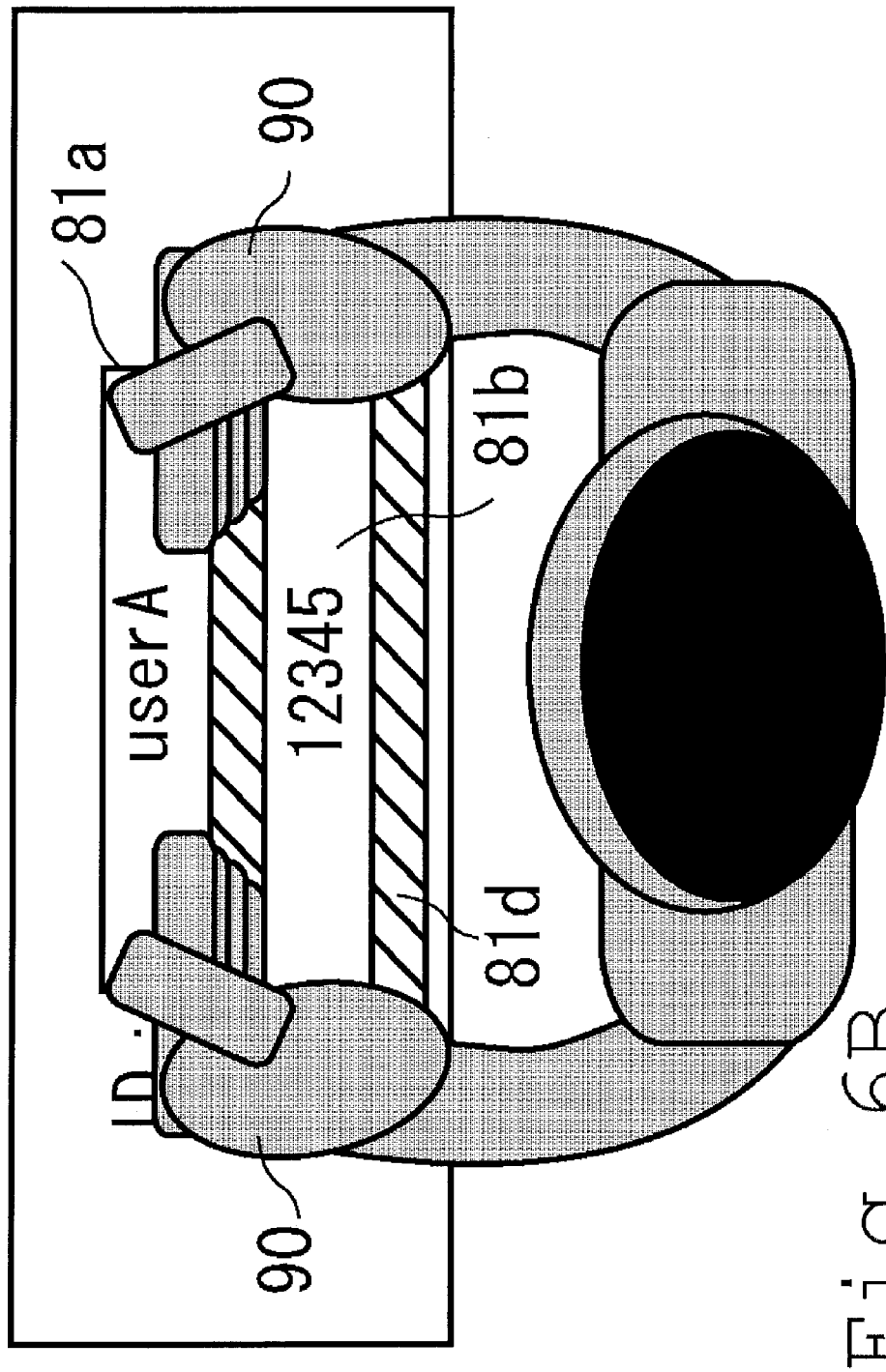

AUTHENTICATION APPARATUS SHOWING INPUTTED PASSWORD UNRECOGNIZABLE

INCORPORATION BY REFERENCE

This application is based on and claims the benefit of priority from Japanese Patent Application No. 2013-247050 filed on Nov. 29, 2013, the contents of which are hereby incorporated by reference.

BACKGROUND

The present disclosure relates to the authentication apparatus showing inputted password unrecognizable.

In the case of pass word authentication, there are some apparatus does not show an inputted password a state as it is by a viewpoint of security.

On the other hand, since a user cannot check what has actually been inputted as a password when showing a password unrecognizable, the user cannot notice an input mistake or the like. Therefore, in case that showing the inputted password unrecognizable, the technology of making the input mistake of a password easy to notice is proposed.

For example, a technology showing a password with a symbol different, respectively is proposed by the case where the same key is inputted continuously, and the case in which a former key and a different key are inputted. A technology is proposed, which shows a password that is not hidden with sign in same state on user's movable, and that shows the password hidden with sign on an image forming apparatus, when a password is inputted via the operation part of the image forming apparatus.

SUMMARY

The authentication apparatus of the present disclosure is an authentication apparatus having a display showing an inputted password as an unrecognizable state to password viewing area in display. The authentication apparatus has the touch panel and the control part. A touch panel is arranged at the display surface of the display and is detected that a peripheral region of the password viewing area is pushed. A control part changes into the displaying condition of the password shown in the password viewing area from an unrecognizable state to a recognizable state while a peripheral region is pushed along with the password viewing area.

BRIEF DESCRIPTION OF THE DRAWINGS

FIG. 6B is an image figure showing signs that inputted PW is shown.

DETAILED DESCRIPTION

Subsequently, an embodiment of the disclosure is described in detail with reference to drawings.

Figure 1:
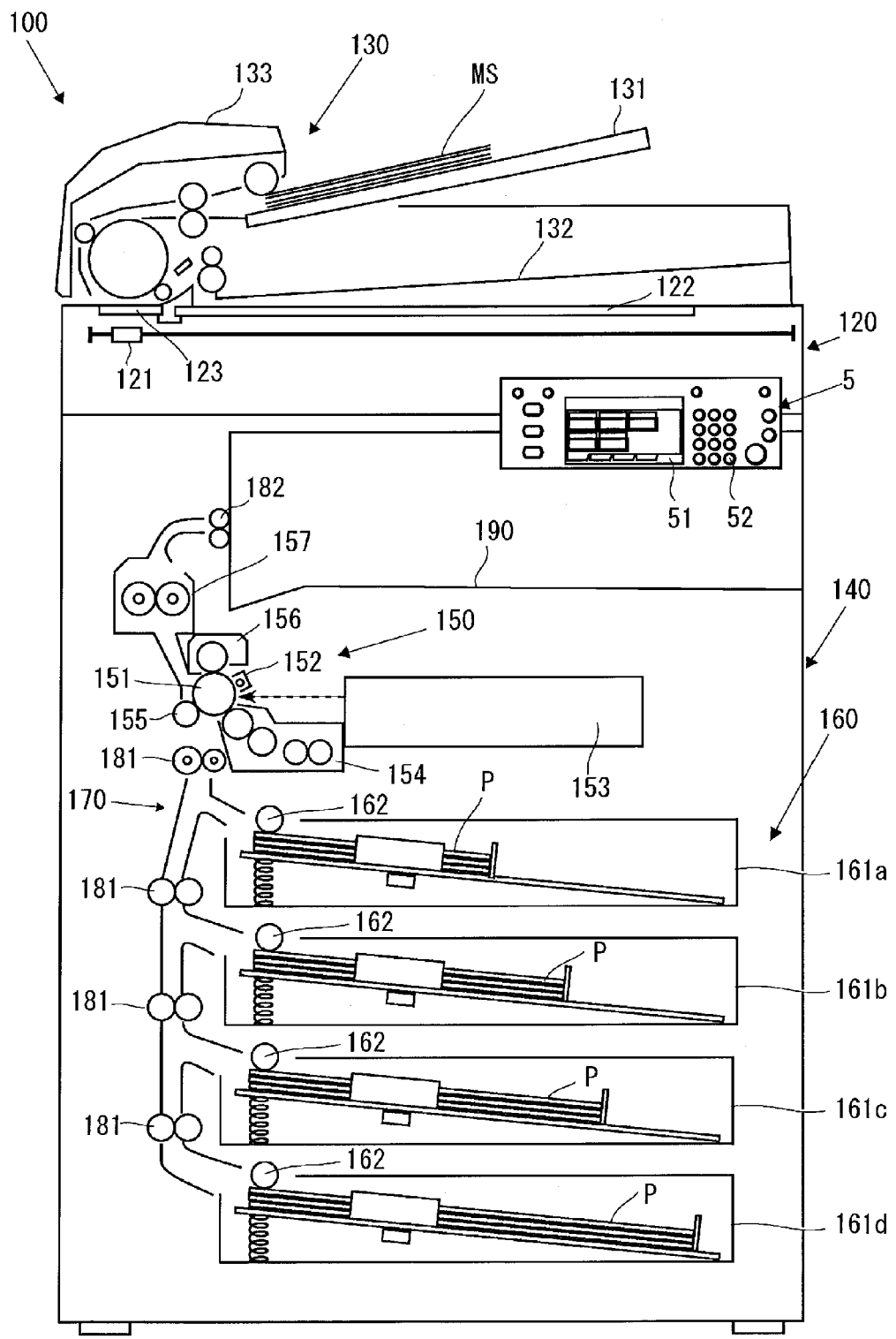
FIG. 1 is a cross section of the image forming apparatus related to the present disclosure.

Image forming apparatus 100 (authentication apparatus) of an embodiment of the disclosure is a composite machine that has a duplication function, a print function, a scanner function, or the like. Image forming apparatus 100 has manuscript reading part 120, manuscript feeding part 130, and printing part 140 when FIG. 1 is referred to. Manuscript reading part 120 is allocated in an upper part of printing part 140, and manuscript feeding part 130 is allocated in the upper part of manuscript reading part 120.

Operation part 5 sets up image forming apparatus 100 and instructs operation is allocated in the in front of side of image forming apparatus 100. Operation part 5 has operation panel 51 and manual operation button 52. By a user operating operation part 5 and inputs instructions, image forming apparatus 100 is set up and is performed various functions, such as image formation. Operation panel 51 has the display. The display shows the various operation keys that accept an operational input. Operation panel 51 has the touch panel. The touch panel is provided on the display surface of the display, which detects the input by press of an operator's fingertip, a stylus, or the like, outputs the signal corresponding to the position, and accepts the operation to the operation key shown on the display. Manual operation button 52 includes a start button, a stop/clear button, a reset button, a numeric keypad, or the like. The start button is a button for a user to direct to start image formation. The stop/clear button is buttons for using it, when stopping image formation. The reset button is a button for using it, when making various setup of image forming apparatus 100 into a default.

Manuscript reading part 120 has scanner 121, platen glass 122, and manuscript reading slit 123. Scanner 121 comprises an exposure lamp, a CCD (Charge Coupled Device) sensor, or the like, and is comprised by the transportation direction of manuscript MS by manuscript feeding part 130 movable. Platen glass 122 is the manuscript stand comprised by transparent members, such as glass. Manuscript reading slit 123 has the slit formed in the transportation direction and orthogonal orientation of manuscript MS by manuscript feeding part 130.

Manuscript feeding part 130 is comprised by retractable, by raising manuscript feeding part 130 up, can make the upper surface of platen glass 122 able to open wide, and can place manuscript MS in platen glass 122. In case that it reads manuscript MS placed in platen glass 122, scanner 121 is moved to the position that faces platen glass 122. Scanner 121 reads manuscript MS, scanning manuscript MS placed in platen glass 122, and acquires image data.

Manuscript feeding part 130 has manuscript mounting part 131, manuscript discharge part 132, and manuscript transport mechanism 133. Manuscript MS placed in manuscript mounting part 131 according to manuscript transport mechanism 133 lets out one at a time in order. Manuscript MS is conveyed in the position that faces manuscript reading slit 123 of manuscript reading part 120. Manuscript MS is discharged by manuscript discharge part 132 after that. In case that scanner 121 reads manuscript MS conveyed by manuscript feeding part 130, scanner 121 is moved to the position that faces manuscript reading slit 123. Via manuscript reading slit 123, scanner 121 reads manuscript MS synchronizing with the conveying action of manuscript MS by manuscript feeding part 130, and acquires image data.

Printing part 140 has image formation part 150. Printing part 140 has feeding part 160, carrying path 170, conveying roller 181, ejection roller 182, and discharging tray 190 in the body. Discharging tray 190 in the body is provided in the ejection space in the body of image forming apparatus 100.

Feeding part 160 has a plurality of sheet paper cassette 161a-d that stores recording paper P. Feeding part 160 has feed roller 162 that lets out one sheet of recording paper P at a time to carrying path 170 from sheet paper cassette 161a-d. Feed roller 162, conveying roller 181, and ejection roller 182 function as a conveyance part, and recording paper P is conveyed. Recording paper P lets out to carrying path 170 by feed roller 162 is conveyed by image formation part 150 with conveying roller 181. Then, recording paper P recorded by image formation part 150 is led to ejection roller 182 and is outputted to discharging tray 190 in the body as printed matter. In the present embodiment, four sheet paper cassette 161a-d are provided.

Image formation part 150 has photo conductor drum 151, charging part 152, exposure part 153, developing part 154, transfer part 155, cleaning part 156, and fixing part 157. Exposure part 153 is an optical unit having a laser device, a mirror, or the like. Exposure part 153 outputs a laser beam based on image data, and exposes photo conductor drum 151 electrified by charging part 152. Thereby, an electrostatic latent image is formed in the surface of photo conductor drum 151. Developing part 154 is a development unit that develops the electrostatic latent image formed in photo conductor drum 151 using the toner. Developing part 154 makes the toner image based on an electrostatic latent image form on photo conductor drum 151. Transfer part 155 makes recording paper P transfer the toner image formed on photo conductor drum 151 of developing part 154. By transfer part 155, fixing part 157 heats recording paper P with which the toner image was transferred, and fixes a toner image to recording paper P.

Figure 2:
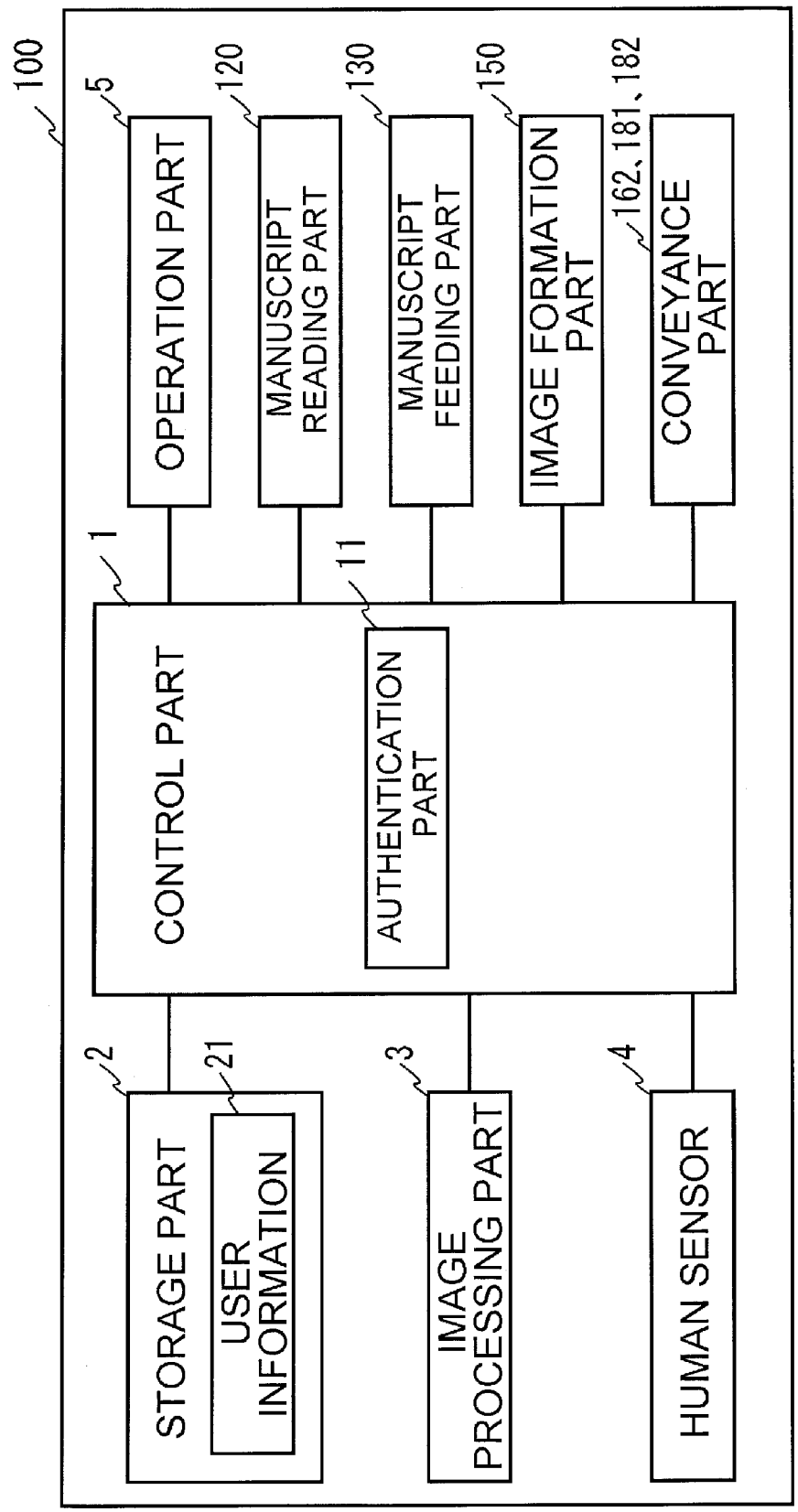
FIG. 2 is a block diagram showing the schematic structure of the image forming apparatus shown in FIG. 1.

The block diagram showing the schematic structure of image forming apparatus 100 is shown in FIG. 2. Abovementioned operation part 5, manuscript reading part 120, manuscript feeding part 130, image formation part 150, and conveyance part (feed roller 162, conveying roller 181, ejection roller 182) are connected to control part 1. As for each part, operation is controlled by control part 1. Storage part 2, image processing part 3, and human sensor 4 are connected to control part 1.

Storage parts 2 are storage parts the image data acquired by reading a manuscript by manuscript reading part 120 is memorized to be, such as semiconductor memory and HDD (Hard Disk Drive). ID (Identification) and PW (Password) are memorized by storage part 2 as user information 21 associated for every user.

Image processing part 3 is a processing part that carries out predetermined image processing to image data, for example, the image improvement process of a scaling process, density control, gradation adjustment, or the like, or the like, is carried out.

Human sensor 4 has the function to detect whether there is any user before image forming apparatus 100.

Control parts 1 are information processing parts, such as a microcomputer having a non-transitory recording medium, such as ROM (Read Only Memory), RAM (Random Access Memory), or the like. The control program for controlling operation of image forming apparatus 100 is memorized in ROM. Control part 1 reads the control program memorized by ROM, is making RAM expand a control program, and controls a whole device according to the predetermined instructions information inputted from operation part 5. Control part 1 functions as authentication part 11 that performs user authentication based on a user's ID and PW that are inputted via operation part 5.

Figure 3:
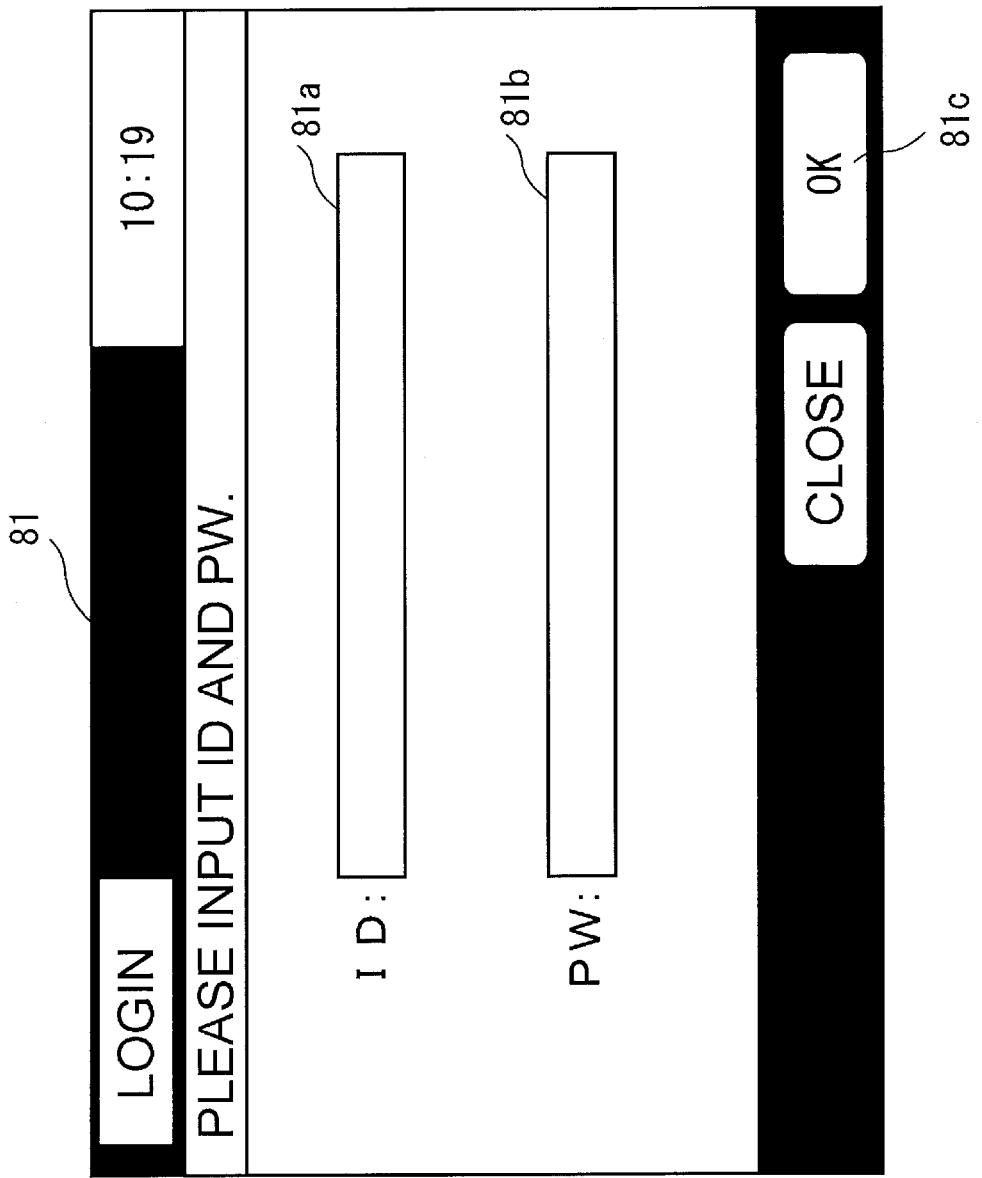
FIG. 3 shows an example of a login screen showing in the operation part as shown in FIG. 1.

For example, FIG. 3 shows login screen 81 show on operation panel 51 in operation part 5. ID display area 81a, PW viewing area 81b, and OK button 81c are provided in login screen 81. The inputted ID is shown on ID display area 81a. Inputted PW is shown on PW viewing area 81b with unrecognized state, such as symbol of "*," mosaics, or the like.

Figure 4:
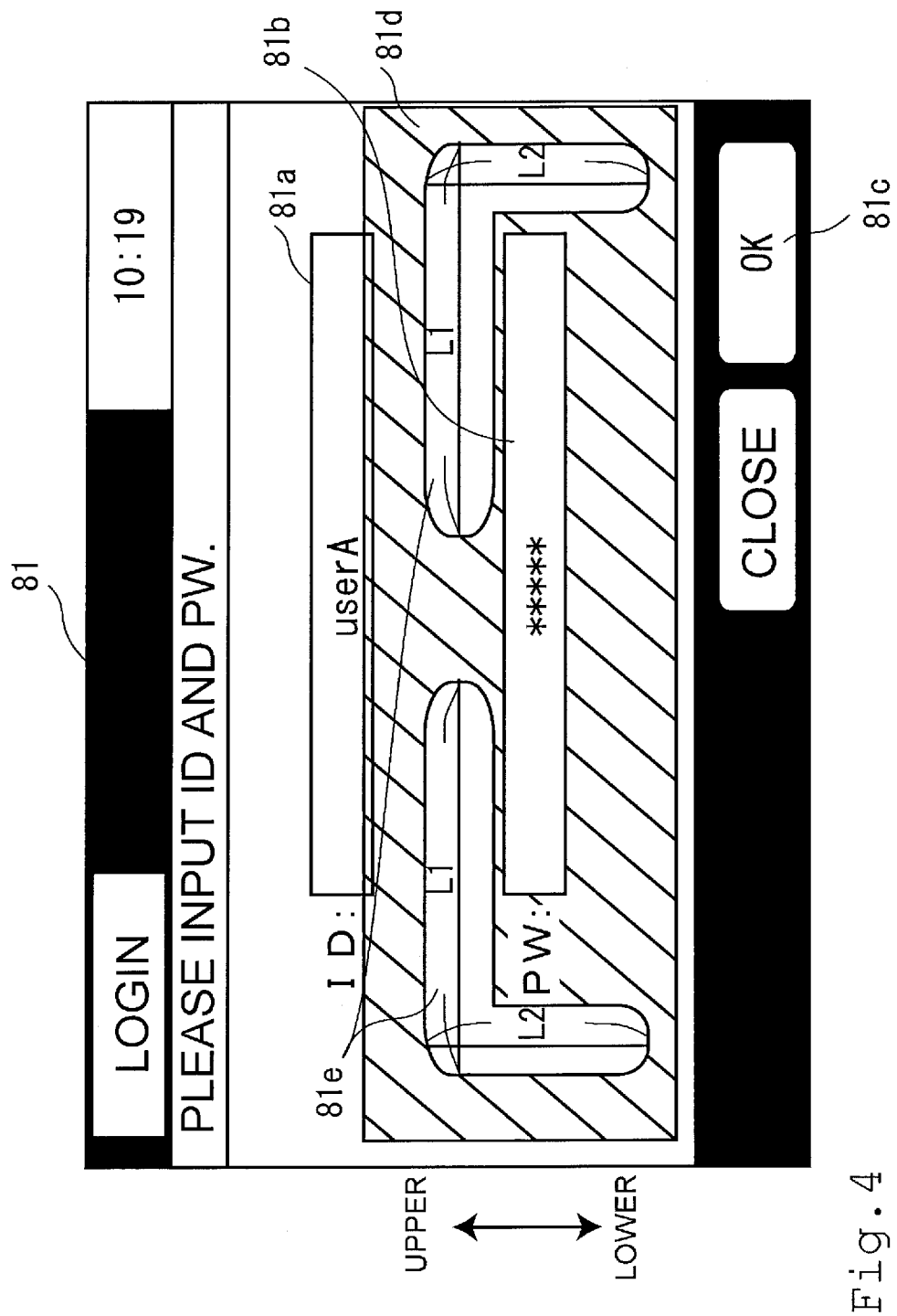
FIG. 4 is a figure showing PW peripheral region of the login screen as shown in FIG. 3.

As shown in FIG. 4, PW peripheral region 81d are provided in the circumference of PW viewing area 81b of rectangular shape. In PW peripheral region 81d, the area range is set up. In this area range, when the circumference of PW viewing area 81b is enclosed by hand, PW is shown on PW viewing area 81b is hidden from others. Authentication part 11 judges with having been pushed along with PW viewing areas 81b, when pressing region 81e in which PW peripheral region 81d are pushed and formed by user meets at least one of the sides that adjoin the upper side and upper side of PW viewing area 81b.

When detecting the circumference of PW viewing area 81b is pushed via operation panel 51, the displaying condition of PW showing PW viewing area 81b changes from an unrecognizable state to a recognizable state. Thereby, the inputted PW is shown. When ID and PW into which OK button 81c was pushed and inputted are decided, authentication part 11 will compare with ID and PW of user information 21 ID and PW that were inputted. In case that these coincide each other, authentication part 11 accepts login in image forming apparatus 100 of the user corresponding to ID.

Figure 5:
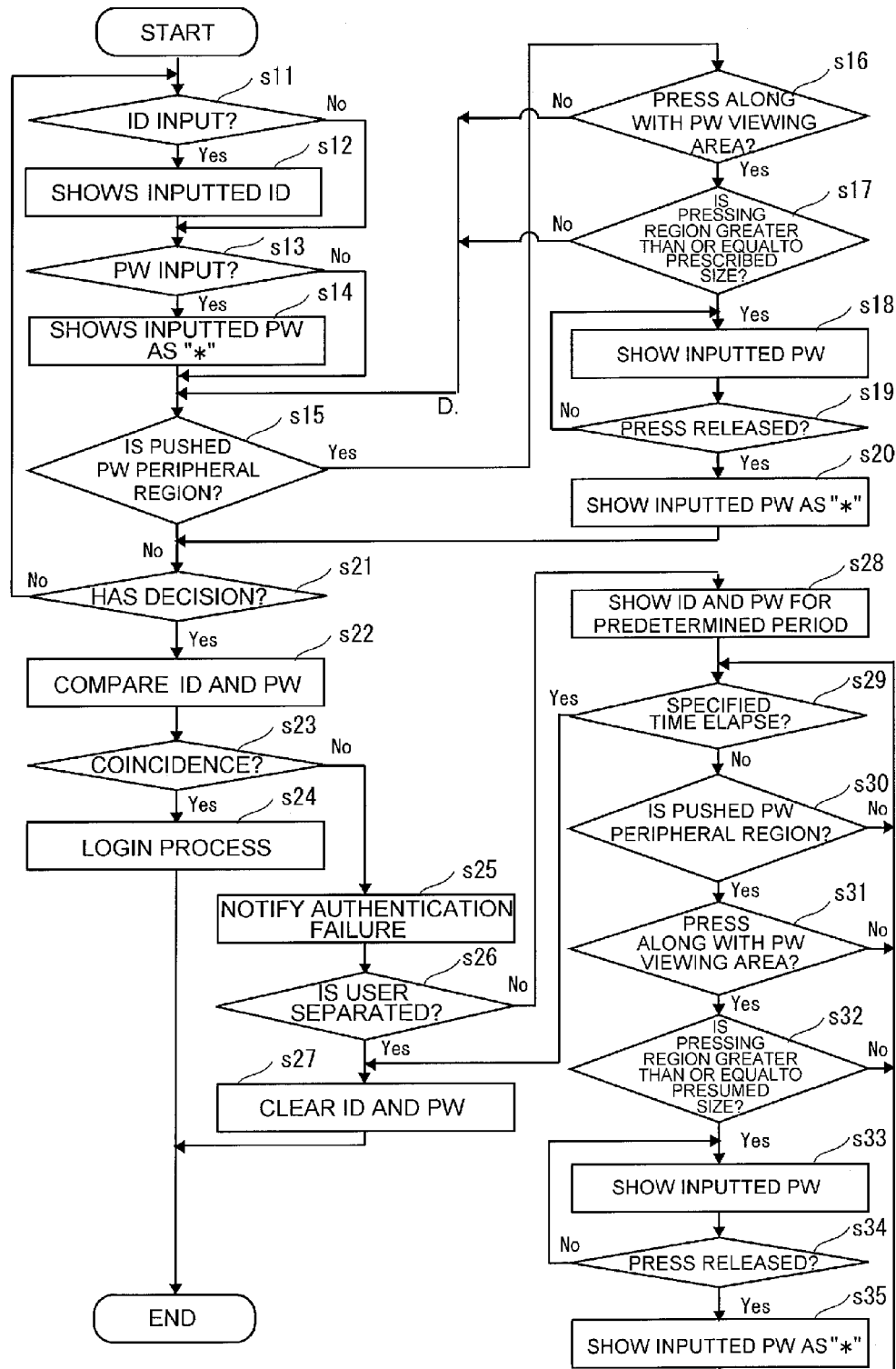
FIG. 5 is a flow chart that shows the login process flow of the image forming apparatus as shown in FIG. 2.

In detail, with reference to FIG. 5, the login process flow of image forming apparatus 100 is explained. In the following, inputted PW is explained as an unrecognizable displaying condition as what showing "*" on PW viewing area 81b.

Firstly, authentication part 11 judges whether the ID input is performed (Step s11). If ID input is performed (Yes in Step s11,) inputted ID is shown ID display area 81a (Step s12). If ID input is not performed (No in Step s11), the process of Step s13 is performed.

Continuing, authentication part 11 judges whether PW input is performed (Step s13). If inputting PW (Yes in Step s13), inputted PW is shown as "*" on PW viewing area 81b (Step s14). If not inputting PW (No in Step s13), the process of Step s15 is performed.

Continuing, authentication part 11 judges whether PW peripheral region 81d provided in the circumference of PW viewing area 81b were pushed (Step s15). If PW peripheral region 81d is pushed (Yes in Step s15), pushing along with PW viewing areas 81b is judged (Step s16).

In case that it is pushed along with PW viewing area 81b (Yes in Step s16), authentication part 11 judges whether or not pressing region 81e is greater than or equal to a prescribed size (Step s17). Authentication part 11 measures the size of pressing region 81e. The longitudinal direction of PW viewing area 81b has length beyond L1, and when the transverse direction of PW viewing area 81b has length beyond L2, authentication part 11 judges with pressing region 81e being more than prescribed size. In this case, as approximately 90 degree is made with a palm and a finger, when the side of a hand is pressed against PW peripheral region 81d along the upper side of PW viewing area 81b and side that adjoins the upper side, the size of pressing region 81e may become greater than or equal to greater than or equal to L1 and L2.

In case that it is not pushed along with PW viewing area 81b, and in case that pressing region 81e is not more than prescribed size (No in Step s16 and No in Step s17), authentication part 11 returns to the process to judge whether PW peripheral region 81*d* are pushed (Step s15). If pressing region 81*e* is greater than or equal to prescribed size (Yes in Step s17), authentication part 11 changes PW shown as "*" into inputted PW itself (Step s18). Until press is released (No in Step s19), the inputted PW itself is shown on PW viewing area 81*b* (Step s18). When press is released (Yes in Step s19), authentication part 11 hides inputted PW by "*" again and shows an unrecognizable state (Step s20).

If the side of a hand is pushed on PW peripheral region 81*d* as approximately 90 degree with the palm and fingers of both hands, inputted PW is shown so that confidentiality can be raised more. In this case, two pressing regions 81*e* are formed. Authentication part 11 shows inputted PW in case that each of formed pressing region 81*e* is more than greater than or equal to L1 and L2.

Continuing, authentication part 11 judges whether or not the input of ID and PW is confirmed (OK button 81*c* is pushed or not) (Step s21). Further, also if authentication part 11 judges PW peripheral regions 81*d* not being pressed as above (No in step s15), the process to judge whether or not the input ID and PW having been confirmed are performed (Step s21). In case that the input ID and PW is not confirmed (No in Step s21), a process returns to Step s11.

When OK button 81*c* is pushed and the input ID and PW is confirmed (Yes in Step s21), authentication part 11 compares inputted ID and PW with ID and PW of user information 21 memorized in storage part 2 (Step s22). If matching the comparison result (Yes in Step s23), authentication part 11 carries out a login process of the user corresponding to the ID (Step s24), and will end the present process.

If not matching the comparison result (No in Step s23), authentication part 11 notifies authentication being failed to the user via operation part 5 or the like (Step s25). Also, authentication part 11 judges whether or not the user is separated by human sensor 4 (Step s26). In case that a user separates (Yes in Step s26), authentication part 11 clears ID shown at ID display area 81*a* and PW shown PW viewing area 81*b* (Step s27), and ends the present process.

On the other hand, incase that the user is not separated (No in Step s26), authentication part 11 keeps ID and PW showing for a predetermined period (Step s28). Authentication part 11, for not having passed a predetermined time (No in step s29), judges whether PW peripheral region 81*d* are pushed (Step s30).

In addition, when the input of ID and PW is confirmed, ID shown on ID display area 81*a* and PW shown on PW viewing area 81*b* are usually cleared. However, a cause cannot be specified in case that authentication fails. That is, the user cannot specify having failure owing to input mistakes, such as a mistake to push PW, or having failed not a mistake but misunderstood the PW itself. Therefore, in the present embodiment, ID and PW are kept showing for a predetermined period so that the user can check whether the user inputted what as PW and has failed in authentication.

In case that PW peripheral region 81*d* are pushed into predetermined time (Yes in Step s30), authentication part 11 judges whether or not being pushed along with PW viewing area 81*b* (Step s31). In case of being pushed along with PW viewing area 81*b* (Yes in Step s31), authentication part 11 judges whether pressing region 81*e* is more than prescribed size (Step s32). For example, authentication part 11 judges whether the longitudinal direction of PW viewing area 81*b* has length greater than or equal to L1, and the transverse direction of PW viewing area 81*b* has length greater than or equal to L2. In case that pressing region 81*e* has size greater than or equal to a prescribed size (Yes in step s32), authentication part 11 show inputted PW on PW viewing area 81*b* (Step s33). Until press is released (No in Step s34), inputted PW is shown on PW viewing area 81*b* (Step s33). When press is canceled (Yes in Step s34), authentication part 11 will hide inputted PW by "*" again, shows an unrecognizable state (Step s35), and returns a process to Step s29.

In case that PW peripheral region 81*d* is not pushed, PW peripheral region 81*d* is pushed not along PW viewing area 81*b*, and pressing region 81*e* is not greater than or equal to in prescribed size (No in step s30, No in Step s31, and No in Step s32) a process returns to Step s29.

When predetermined time passes (Yes in Step s29), authentication part 11 clears ID shown on ID display area 81*a* and PW shown on PW viewing area 81*b* (Step s27), and ends the present process.

Figure 6A:
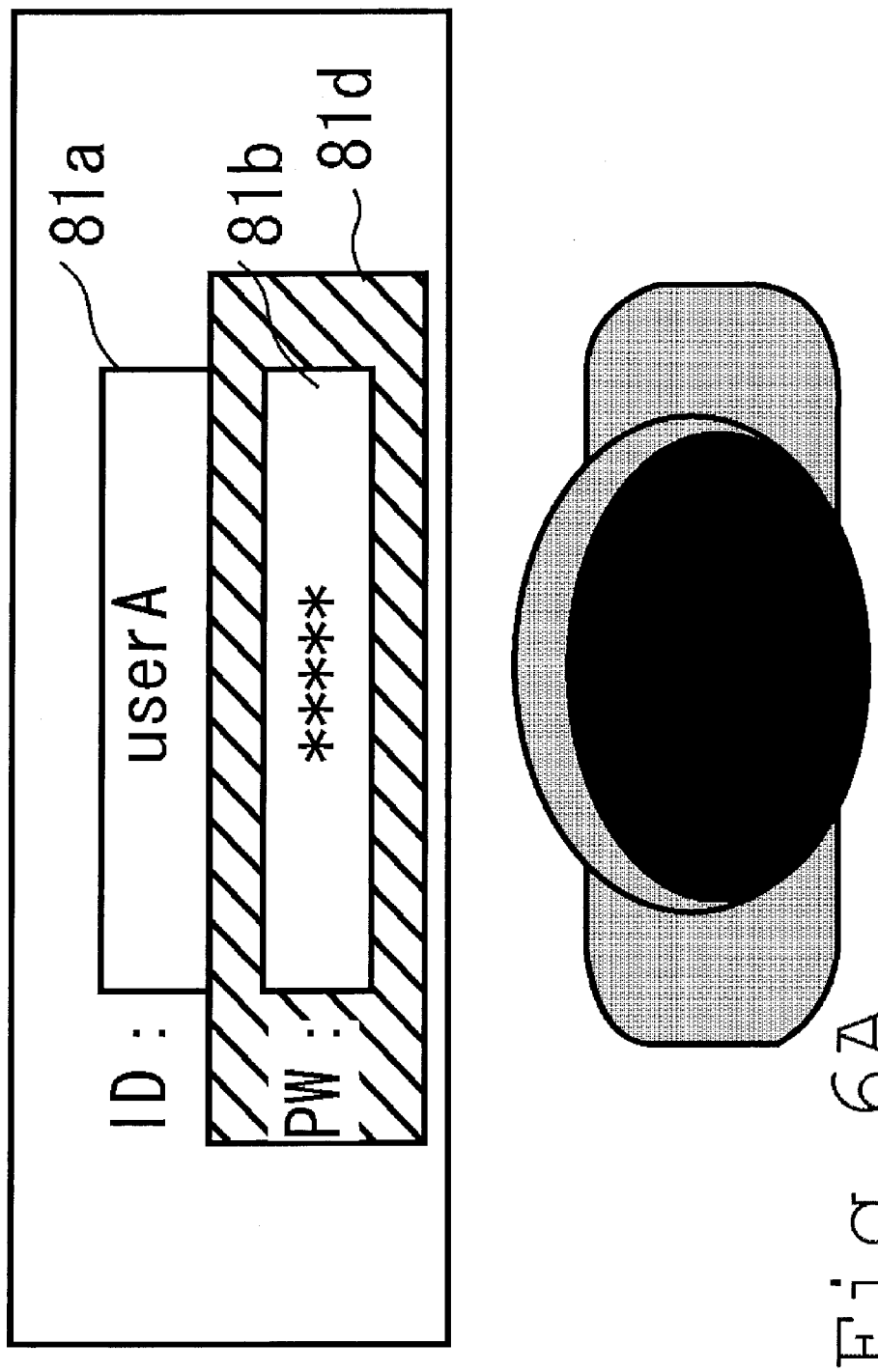
FIG. 6A is an image figure showing signs that inputted PW is shown.

Thereby, in case that showing PW as "*" as shown in FIG. 6A, as shown in FIG. 6B, the user can show the inputted PW itself simply by applying and hiding a hand in PW peripheral region 81*d* so that PW viewing area 81*b* may not be seen by others, where confidentiality is maintained. After a user's verifying inputted PW, when hands are lifted from PW peripheral region 81*d* as shown in FIG. 6A, PW returns to show in the unrecognizable state as hidden by "*."

As explained above, in the present embodiment, when PW peripheral region 81*d* is pushed along PW viewing area 81*b* so that PW viewing area 81*b* is hidden, inputted PW is shown itself on PW viewing area 81*b* while pushing. Therefore, according to the present embodiment, the user can check simply what where confidentiality is maintained, has been inputted into PW.

The inputted password itself was not able to be expressed as typical technology. In typical technology, user prepares a personal digital assistant and password shown on personal digital assistant may try to be stolen by others, and confidentiality is not fully secured. Therefore, in case that showing the inputted password as the unrecognizable state, according to a user's operation, the technology can maintain confidentiality and show a recognizable state is searched for.

According to the present disclosure, in case that showing the inputted password as the unrecognizable state according to a user's operation, the technology can maintain confidentiality and shows a recognizable state can be provided.

It cannot be overemphasized that it can change of all sorts in the region that the present disclosure is not limited to the embodiment mentioned above, and does not deviate from the meaning of the present disclosure.

Figure 7A:
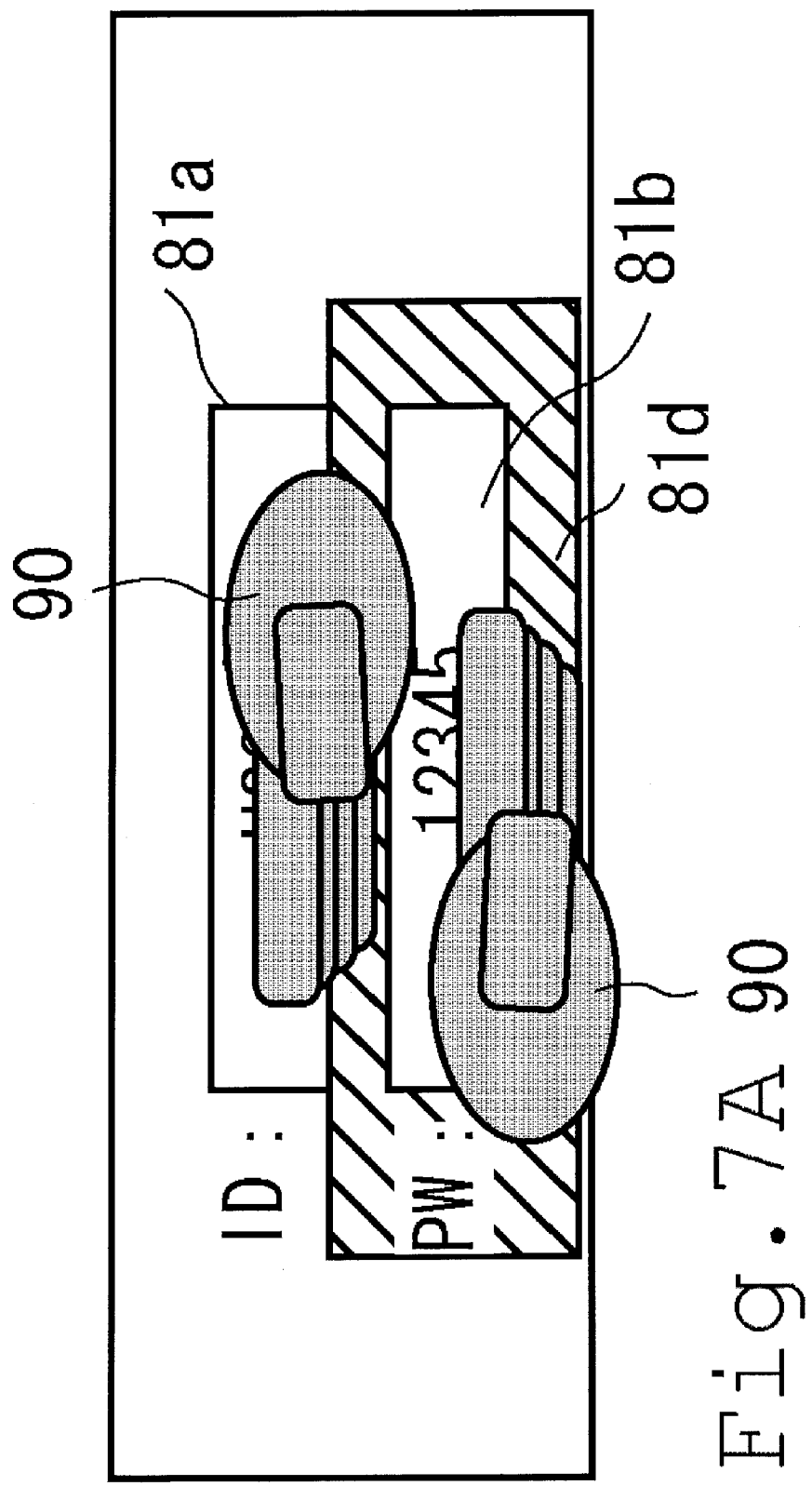
FIG. 7A is an image figure showing other press forms for showing inputted PW.
Figure 7B:
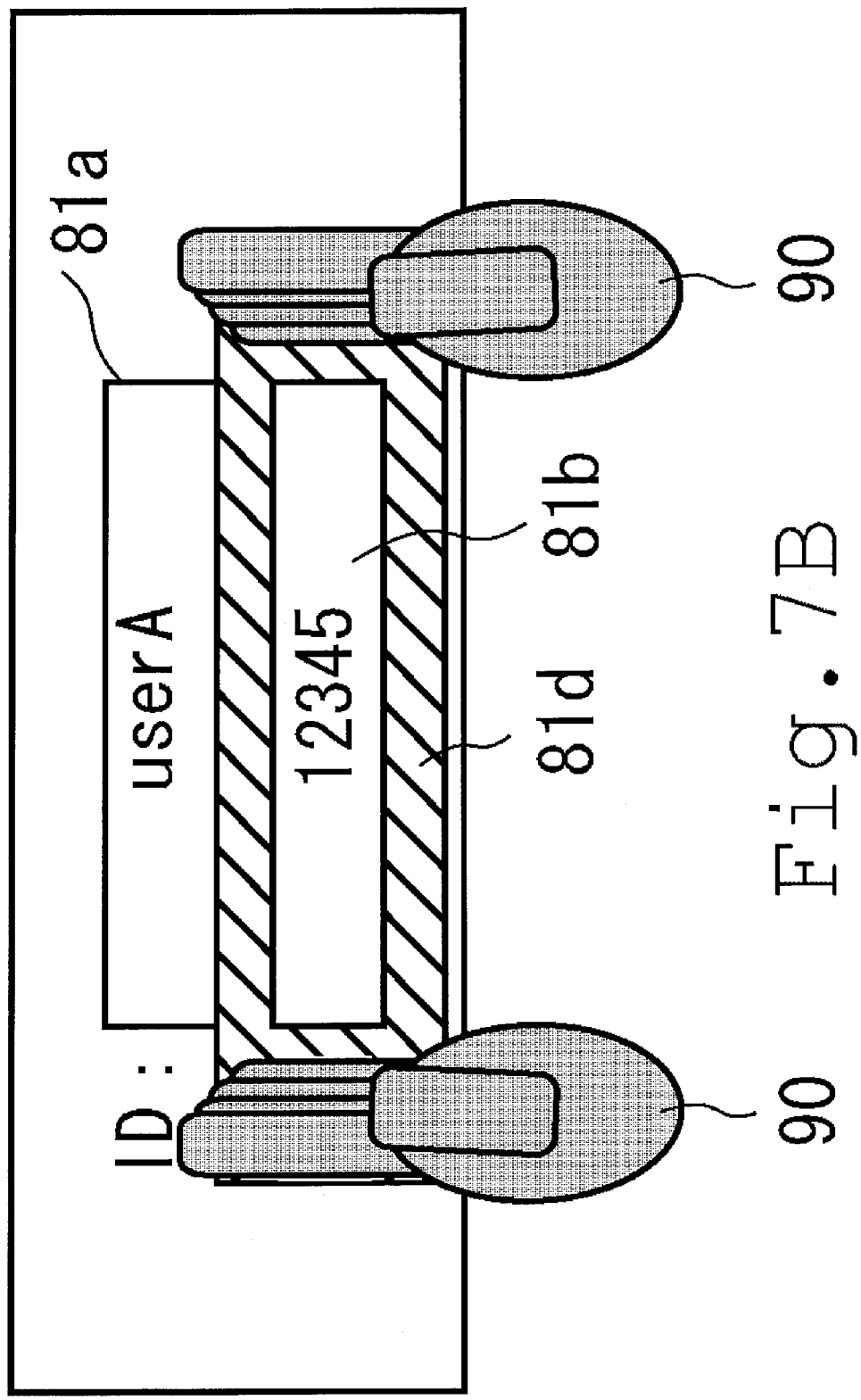
FIG. 7B is an image figure showing other press forms for showing inputted PW.

For example, as long as the hand is applied to PW peripheral region 81*d* so that PW viewing area 81*b* may be hidden even if a user does not bend a hand at approximately 90 degree as shown in FIG. 7A and FIG. 7B, it may show the inputted PW. In the case of FIG. 7A and FIG. 7B, inputted PW is shown in case that each of the pressing region where the side of the hand was pressed against PW peripheral region 81*d*, and was formed on the straight line along with two sides that PW viewing area 81*b* faces is more than predetermined length. Also, in case that both hands, which is the state where one hand is bent at approximately 90 degree and the opposite hand is extended to straight shape, are touched to PW peripheral region 81*d*, inputted PW can be shown. In this case, authentication part 11 shows inputted PW in case in which one pressing region is formed to greater than or equal to as for prescribed size along the upper side and upper side of PW viewing area 81*b*, the other region is formed to greater than or equal to as for prescribed size at a side adjoins the lower side or upper side of PW viewing area 81*b*.

Also, in case that authentication fails, only time (for example, 5 seconds or the like) when users cannot exchanged may keep showing ID of ID display area 81a, and PW of PW viewing area 81b irrespective of whether the user separated or not. In this case, human sensor 4 can be made unnecessary.

What is claimed is:

1. An authentication apparatus having a display displaying an inputted password in an unrecognizable state on a password viewing area, comprising:
    a touch panel that is arranged at a display surface of the display and detects that a peripheral region of the password viewing area is pushed, wherein an area range of the peripheral region is previously set and the area range has a pressing region formed when the peripheral region is pushed within the range of the area range; and
    a control part that displays the inputted password on the password viewing area in the unrecognizable state when the password is inputted through the touch panel, and changes, while the pressing region is pushed along the upper side of the password viewing area and along at least one of the sides adjoining the upper side, the displaying condition of the password displayed on the password viewing area from the unrecognizable state into a recognizable state.

2. The authentication apparatus according to claim 1, wherein
    the control part changes, while the peripheral region is pushed along with two facing sides of the password viewing area, the displaying condition of the password showing on the password viewing area from the unrecognizable state into the recognizable state.

3. The authentication apparatus according to claim 1, wherein
    the control part compares the inputted password with the previously memorized password when confirmation operation of confirming the inputted password is carried out, and, in case of being not matched, keeps showing the inputted password as the unrecognizable state on the password viewing area for a predetermined period.

4. The authentication apparatus according to claim 3, further comprising a human sensor that detects whether an operator is before the authentication apparatus, wherein
    the control part, when the operator is before the authentication apparatus, keeps displaying the inputted password in the unrecognizable state on the password viewing area for the predetermined period during which the operator can check, by pushing the pressing region, what password is inputted and failed in authentication.

5. The authentication apparatus according to claim 4, wherein the control part clears the password when the predetermined period is passed.

6. The authentication apparatus according to claim 3, wherein
    the predetermined period is a period during which an operator can check, by pushing the pressing region, what password is inputted and failed in authentication, and
    the control part clears the password when the predetermined period is passed.

7. An authentication method performed by an authentication apparatus having a display displaying an inputted password in an unrecognizable state on a password viewing area, comprising the steps of:
    displaying the inputted password on the password viewing area in the unrecognizable state when the password is inputted through the touch panel, and
    detecting that the peripheral region of the password viewing area is pushed, wherein an area range of the peripheral region is previously set and the area range has a pressing region formed when the peripheral region is pushed within the range of the area range, and
    changing, while the pressing region is pushed along the upper side of the password viewing area and along at least one of the sides adjoining the upper side, the displaying condition of the password displayed on the password viewing area from the unrecognizable state into the recognizable state.

* * * * *